United States Patent
Haruna et al.

(10) Patent No.: US 9,199,877 B2
(45) Date of Patent: Dec. 1, 2015

(54) METHOD FOR MANUFACTURING OPTICAL FIBER BASE MATERIAL, AND OPTICAL FIBER

(71) Applicant: SUMITOMO ELECTRIC INDUSTRIES, LTD., Osaka-shi, Osaka (JP)

(72) Inventors: Tetsuya Haruna, Yokohama (JP); Masaaki Hirano, Yokohama (JP); Yoshiaki Tamura, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 64 days.

(21) Appl. No.: 14/115,660

(22) PCT Filed: Dec. 28, 2012

(86) PCT No.: PCT/JP2012/084016
§ 371 (c)(1),
(2) Date: Nov. 5, 2013

(87) PCT Pub. No.: WO2013/105459
PCT Pub. Date: Jul. 18, 2013

(65) Prior Publication Data
US 2014/0127507 A1 May 8, 2014

(30) Foreign Application Priority Data

Jan. 11, 2012 (JP) ................................. 2012-003333

(51) Int. Cl.
*C03B 37/018* (2006.01)
*C03C 25/60* (2006.01)
(Continued)

(52) U.S. Cl.
CPC .......... *C03C 25/607* (2013.01); *C03B 37/01807* (2013.01); *C03C 25/104* (2013.01); *G02B 6/02395* (2013.01); *C03B 2201/12* (2013.01);
(Continued)

(58) Field of Classification Search
CPC ..................... C03B 37/01807; C03B 2201/50; C03B 2203/22; C03B 2203/23; C03B 2203/26; C03B 2207/90
See application file for complete search history.

(56) References Cited

U.S. PATENT DOCUMENTS 5,146,534 A 9/1992 Lines
6,153,546 A 11/2000 Saitoh et al.
(Continued)

FOREIGN PATENT DOCUMENTS

EP 2 479 150 A1 7/2012
EP 2 808 310 A1 12/2014
(Continued)

*Primary Examiner* — Queenie Dehghan
(74) *Attorney, Agent, or Firm* — Drinker Biddle & Reath LLP (57) ABSTRACT

A method for making a high quality optical fiber preform includes: thermally defusing the alkali metal element into the inner side of a silica glass pipe by heating the glass pipe from the outside by a heat source while vapors of alkali metal salt generated by heating an alkali metal salt is supplied to the inside of the glass pipe from an end thereof; collapsing the glass pipe for forming a core rod; and adding a cladding part around the circumference of the core rod. At the start of the thermal diffusion, the alkali metal salt is heated at a temperature for making the vapor pressure of the alkali metal salt to be 0.1 kPa or less, and thereafter the alkali metal salt is heated up to a temperature for making the vapor pressure of the alkali metal salt to be larger than 0.1 kPa.

8 Claims, 11 Drawing Sheets (51) Int. Cl.
*C03C 25/10* (2006.01)
*G02B 6/02* (2006.01)
*G02B 6/036* (2006.01)

(52) U.S. Cl.
CPC ......... *C03B 2201/20* (2013.01); *C03B 2201/50* (2013.01); *C03B 2203/22* (2013.01); *C03B 2203/23* (2013.01); *C03B 2203/26* (2013.01); *C03B 2207/90* (2013.01); *G02B 6/03611* (2013.01); *G02B 6/03627* (2013.01); *Y10T 428/2964* (2015.01)

(56) References Cited

U.S. PATENT DOCUMENTS

| | | | |
|---|---|---|---|
| 7,088,900 B1 | 8/2006 | Mishra | |
| 7,524,780 B2 | 4/2009 | Ball et al. | |
| 2006/0130530 A1* | 6/2006 | Anderson et al. | ............... 65/394 |
| 2011/0314874 A1* | 12/2011 | Kitamura | ........................ 65/418 |

FOREIGN PATENT DOCUMENTS

| | | |
|---|---|---|
| EP | 2 813 477 | 12/2014 |
| JP | 2005-537210 A | 12/2005 |
| JP | 2007-504080 A | 3/2007 |
| JP | 2008-536190 A | 9/2008 |
| JP | 2009-541796 A | 11/2009 |
| JP | 2010-501894 A | 1/2010 |
| JP | 2010-526749 A | 8/2010 |
| JP | 2012-006779 A | 1/2012 |
| JP | 2012-162410 A | 8/2012 |
| WO | WO-98/02389 A1 | 1/1998 |
| WO | WO-2004/020357 A2 | 3/2004 |
| WO | WO-2005/021455 A2 | 3/2005 |
| WO | WO-2007/149344 A1 | 12/2007 |
| WO | WO-2008/024255 A2 | 2/2008 |
| WO | WO-2008/136929 A1 | 11/2008 |

* cited by examiner

METHOD FOR MANUFACTURING OPTICAL FIBER BASE MATERIAL, AND OPTICAL FIBER

BACKGROUND OF THE INVENTION

1. Field of the Invention

The present invention relates to an optical fiber preform manufacturing method and an optical fiber.

2. Description of the Background Art

Silica glass optical fibers having a core including alkali metal are known (see Patent Literatures 1-10). It is said that when an optical fiber preform is drawn, the viscosity of the core portion thereof can be reduced if the core portion contains alkali metal on the order of several hundred to several ten thousand parts per million, and accordingly the relaxation of silica glass network structure progresses, enabling decrease in the attenuation of the resulting optical fiber.

A diffusion method is known as a method of adding an alkali metal element into silica glass (see Patent Literatures 1 and 2). The diffusion method is such that material vapors of alkali metal or alkali metal salt used as materials are introduced into a glass pipe with a carrier gas while the glass pipe is heated to a temperature in the range of 1500° C. to 2200° C. by an outside heat source, and thereby the alkali metal element is diffusion-doped into the inner surface of the glass pipe.

After the alkali metal element is added in such manner to the inner surface and neighboring portion of a glass pipe, the glass pipe is subjected to diameter reduction by heating. After the diameter reduction, the inner surface of the glass pipe is etched at an appropriate thickness in order to remove a transition metal element, such as Ni, Fe and the like, which have been added simultaneously when the alkali metal is added. Since the alkali metal exhibits quicker diffusion than the transition metal element, it is possible to keep the alkali metal to remain even if the transition metal element is removed by etching the glass surface at a certain thickness.

After the etching, a core rod containing an alkali metal element is fabricated by collapsing the glass pipe by heating. And an optical fiber preform is produced by forming a cladding part on the outside of the alkali metal-containing core rod. Thus, an optical fiber can be manufactured by drawing the optical fiber preform.

In the diffusion method, vapors of alkali metal salt, which are generated by heating an alkali metal salt up to a melting point (for example, melting point of potassium bromide: 734° C.) or higher temperature so as to obtain sufficient vapor pressure, are supplied with a carrier gas to the inside of a glass pipe from an end thereof. And by heating the glass pipe by means of a heat source performing relative movement in the longitudinal direction of the glass pipe, the alkali metal element is oxidized so as to thermally diffuse into the inner side of the glass pipe. Thus, by performing such thermal diffusion process two or more times, a glass pipe containing the alkali metal element is produced.

SUMMARY OF THE INVENTION

Object of the Invention

An object of the present invention is to provide a method for making a high quality optical fiber preform, wherein the generation of foreign substance on the inner surface of a glass pipe can be suppressed at the process of carrying out thermal diffusion of an alkali metal element.

Means for Achieving the Object

To achieve the object, a method of the invention comprises: (1) a thermal diffusion process for oxidizing and thermally defusing an alkali metal element into the inner side of a silica glass pipe by heating the glass pipe by means of a heat source performing relative movement in the longitudinal direction of the glass pipe while vapors of alkali metal salt generated by heating an alkali metal salt are supplied with a carrier gas to the inside of the glass pipe from an end thereof; (2) a collapsing process for forming a core rod by collapsing the glass pipe after the thermal diffusion process; and (3) a cladding process for adding a cladding part around the circumference of the core rod, wherein in the thermal diffusion process, at the start of the thermal diffusion of the alkali metal element into the inner side of the glass pipe, the alkali metal salt is heated at a temperature for making the vapor pressure of the alkali metal salt to be 0.1 kPa or less, and thereafter, during heating of the glass pipe by a heat source, the alkali metal salt is heated up to a temperature for making the vapor pressure of the alkali metal salt to be larger than 0.1 kPa.

According to the optical fiber preform manufacturing method of the present invention, at the start of the thermal diffusion of the alkali metal element into the inner side of the glass pipe in the thermal diffusion process, the vapor pressure of alkali metal salt may be made 0.05 kPa or less. At the time of heating the alkali metal salt up to a temperature for making the vapor pressure of alkali metal salt to be larger than 0.1 kPa, the temperature increase rate may be 5° C./min or more and 15° C./min or less, and the heating temperature may be maintained at intermediate temperature for a given time. At the start of thermal diffusion of the alkali metal element into the inner side of the glass pipe, the heating temperature of alkali metal salt may be the melting point of the alkali metal salt or less, or may be 734° C. or less. An example of alkali metal salt is potassium bromide or potassium iodide. The carrier gas may contain oxygen.

An optical fiber according to another aspect of the present invention is an optical fiber produced from an optical fiber preform made by the optical fiber preform manufacturing method of the present invention, and the attenuation of the optical fiber is 0.170 dB/km or less at the wavelength of 1550 nm. The attenuation of the optical fiber may be 0.165 dB/km or less at a wavelength of 1550 nm.

Effect of the Invention

According to the present invention, it is possible to manufacture a high quality optical fiber preform by restraining generation of foreign substance on the inner surface of the glass pipe in the process of carrying out thermal diffusion of the alkali metal element.

DETAILED DESCRIPTION OF THE INVENTION

In the following, an embodiment of the present invention will be described in reference to the drawings. The drawings are provided for the purpose of explanation only and not intended to limit the scope of the invention. In the drawings, an identical mark represents the same element so that the repetition of explanation may be omitted. The dimensional ratio in a drawing is not necessarily exact.

There have been cases where a foreign substance has been generated on the inner surface of a glass pipe at the thermal diffusion process and consequently a crack has occurred in the glass containing alkali metal, so that making an optical fiber by drawing has failed. Also, even if an optical fiber was made, there was a case where various problems arose: the attenuation of the optical fiber was increased; the strength of the optical fiber decreased, and so on.

According to Patent Literature 10, it is supposed that the crystallization can be restrained by decreasing the chlorine (Cl) concentration of a glass pipe, whereby the above problems can be solved. However, according to this inventor's knowledge, there is a case where a foreign substance appears on the inner surface of a glass pipe even if the Cl concentration of the glass pipe is 50 ppm or less.

The present inventor analyzed a foreign substance generated on the inner surface of a glass pipe in the thermal diffusion process and also investigated the state in which the foreign substance appeared in the thermal diffusion process. Consequently, it was confirmed that the foreign substance was cristobalite which resulted from crystallization of silica glass. It was found that the foreign substance mostly appeared at the first heating when the glass pipe heating was conducted a plurality of times. From these findings it is assumed that such foreign substance was generated because when the heating of the glass pipe was commenced, alkali metal diffused into the glass pipe at excessively high concentration since the alkali metal salt had already accumulated superfluously on the inner surface of the glass pipe at the start of the thermal diffusion of the alkali metal into the glass pipe.

Furthermore, it is assumed that if potassium bromide (KBr) is used as alkali metal salt, comparatively long time is required for heating KBr up to a temperature of 750° C. or more in order to obtain sufficient vapor pressure for diffusion, because the melting point of KBr is 734° C., which is relatively high, and therefore the alkali metal salt has superfluously accumulated on the inner surface of the glass pipe already when the heating temperature reaches the set temperature.

Therefore, it is advisable that in order to restrain generation of foreign substance on the inner surface of a glass pipe in the thermal diffusion process, the glass pipe be heated up to a temperature of 1500° C. or more and 2200° C. or less at which the thermal diffusion of alkali metal is possible when the heating temperature of alkali metal salt as well as the vapor pressure of the alkali metal salt is low. And, while the glass pipe is being heated, preferably, the heating temperature of alkali metal salt is raised gradually up to the desired temperature for attaining the aimed vapor pressure, and the thermal diffusion is carried out a plurality of times while such temperature is maintained. This will make it possible to prevent the alkali metal salt from superfluously depositing on the inner surface of the glass pipe before the start of thermal diffusion and to restrain the occurrence of crystallization on the inner surface of the glass pipe.

Figure 1:
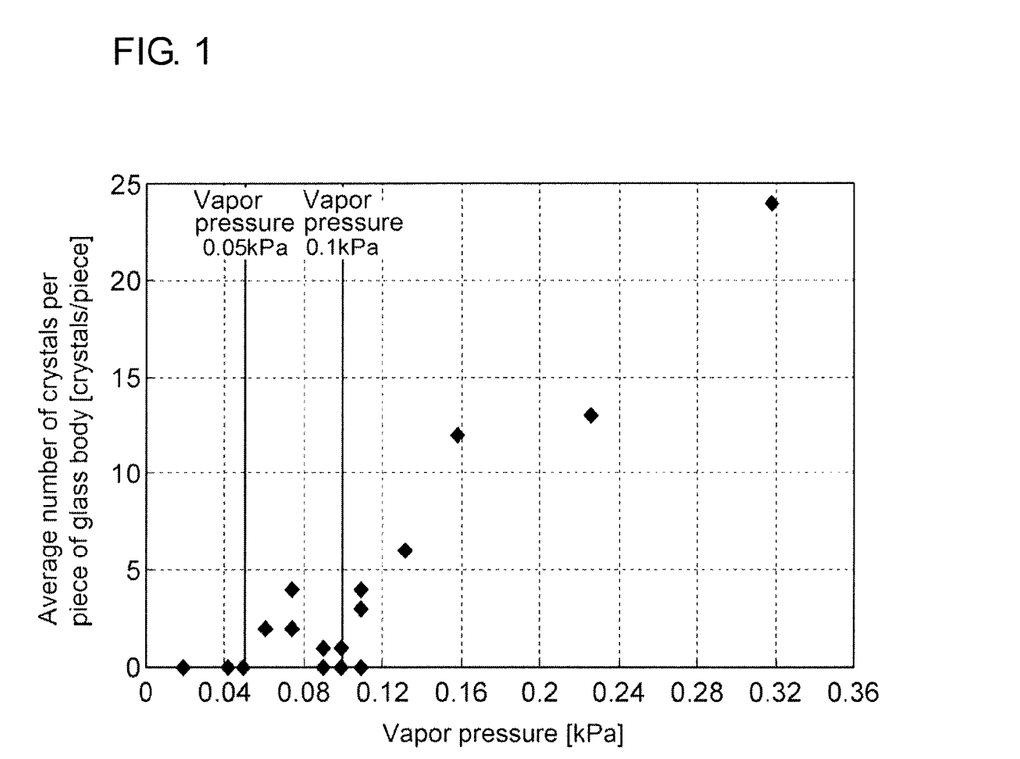
FIG. 1 is a graph showing relationships between the frequency of generation of crystals and vapor pressures of potassium bromide existing at the start of heating a glass pipe.
Figure 2:
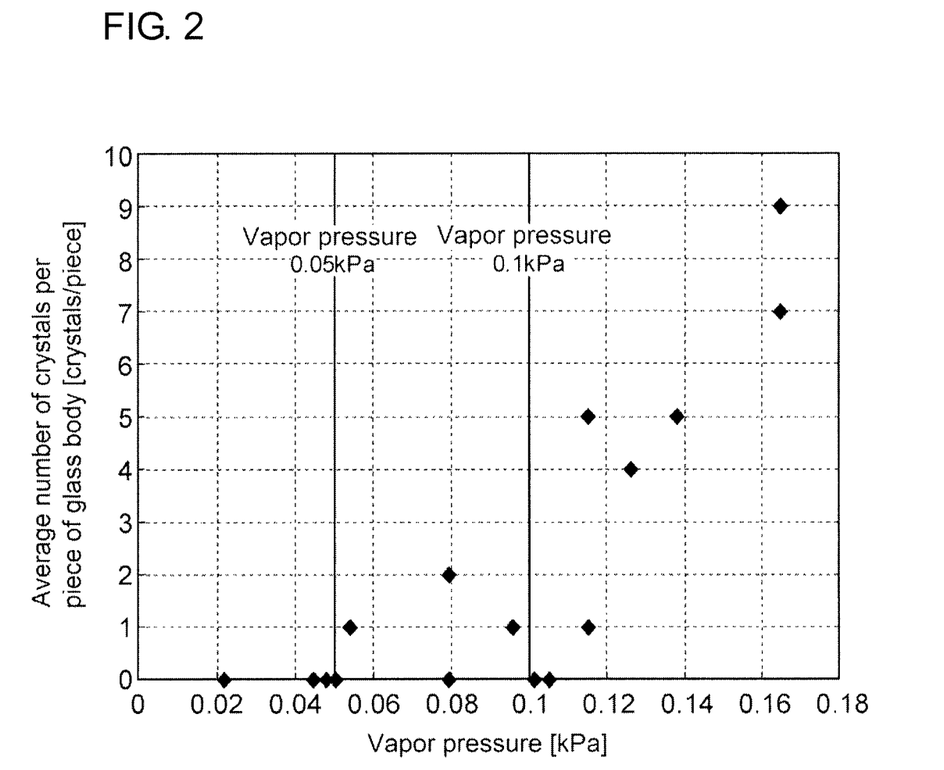
FIG. 2 is a graph showing relationships between the frequency of generation of crystals and vapor pressures of potassium iodide at the start of heating a glass pipe.

FIGS. 1 and 2 are graphs showing relationships between the frequency of generation of crystals and vapor pressures of alkali metal salt existing at the start of heating a glass pipe. In FIG. 1, alkali metal salt is potassium bromide (KBr) and in FIG. 2 it is potassium iodide (KI). In this case, the glass pipe was heated with an oxy-hydrogen burner so that the temperature of outer surface of the silica glass pipe might be 2150° C. An $O_2$ gas was used as a carrier gas, and the flow rate of the $O_2$ gas was set to 1000 sccm. The glass pipe had an outside diameter of 25 mm, an inside diameter of 10 mm, and a length of 550 mm, while the concentrations of chlorine (Cl) and fluorine were respectively 25 atomic ppm and 5000 atomic ppm. The thermal diffusion was carried out by moving the oxy-hydrogen burner 5 times in total along the glass pipe. The thermal diffusion was started at a set temperature, the heating temperature of alkali metal source was raised up to 820° C. during the first movement of the oxy-hydrogen burner, and the thermal diffusion was performed while the temperature of 820° C. was maintained during the following second to fifth movements of the oxy-hydrogen burner.

As shown in FIGS. 1 and 2, it was found that with respect to both KBr and KI, the crystallization occurred more easily when the alkali metal salt was heated at a temperature at which the vapor pressure of alkali metal salt became higher than 0.1 kPa at the start of heating the glass-pipe. Also, for the purposed of restraining the crystallization with respect to both KBr and KI, it is desirable to make the vapor pressure to be 0.05 kPa or less. The temperature at which the vapor pressure became 0.05 kPa or less was found below the respective melting points (the melting point of KBr: 734° C.; the melting point of KI: 681° C.).

From the viewpoint of manufacturing reproducibility, it is preferable that the vapor pressure of alkali metal salt be 0.02 kPa or more at the start of heating the glass pipe. In such case, the heating temperature of alkali metal salt is equal to or more than 700° C. for KBr and is equal to or more than 653° C. for KI.

Figure 3:
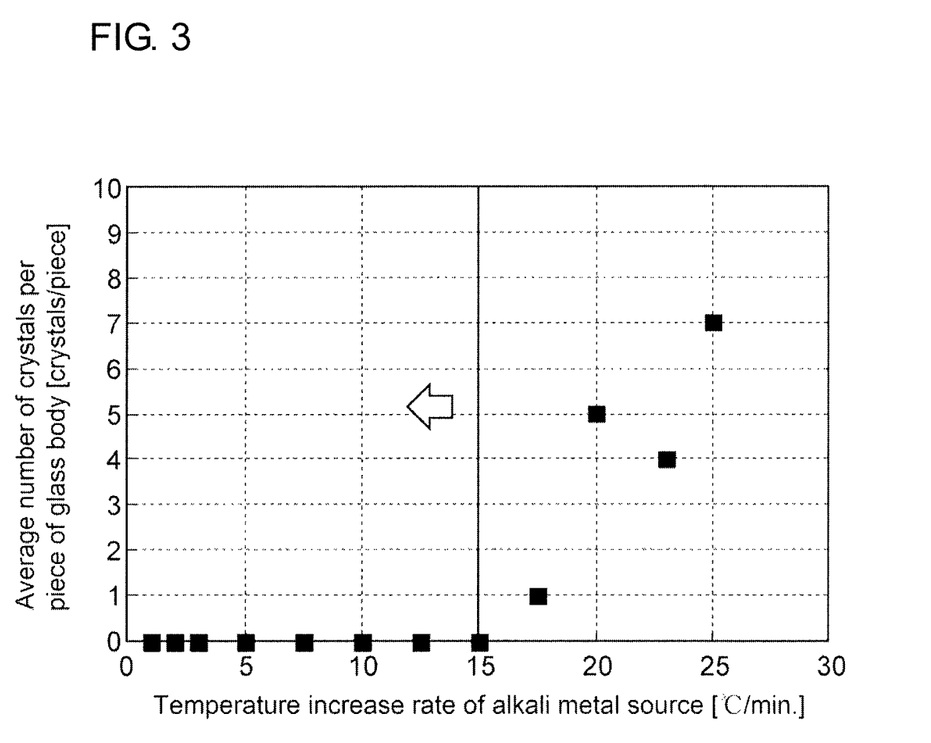
FIG. 3 is a graph showing relationships between the rate of temperature increase of alkali metal salt and the frequency of generation of crystals.
Figure 4:
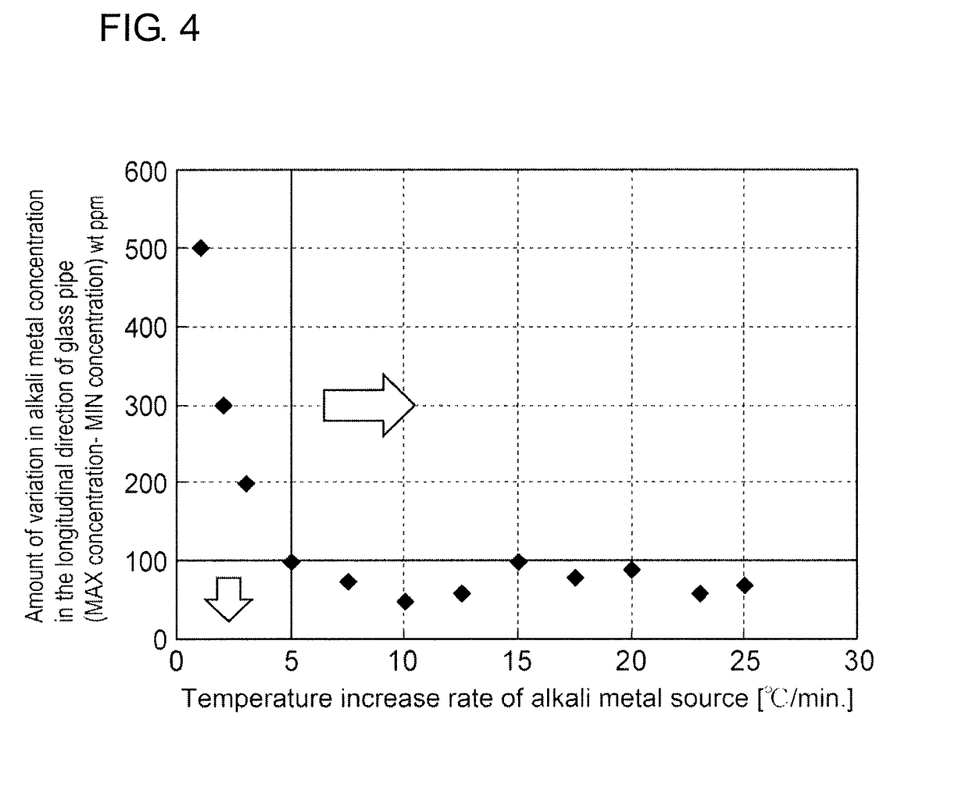
FIG. 4 is a graph showing relationships between the rate of temperature increase of alkali metal salt and the amount of variation in alkali metal concentration in the longitudinal direction of a glass pipe.

FIG. 3 is a graph showing relationships between the rate of temperature increase of alkali metal salt and the frequency of generation of crystals. FIG. 4 is a graph showing relationships between the rate of temperature increase of alkali metal salt and the amount of variation in alkali metal concentration in the longitudinal direction of a glass pipe. As shown in FIG. 3, the generation of crystals can be suppressed by setting the rate of temperature increase of alkali metal salt to 15° C./min or less. As shown in FIG. 4, by making the rate of temperature increase of alkali metal salt to be 5° C./min or more, the amount of variation in alkali metal concentration in the longitudinal direction of the glass pipe can be made as small as 100 atomic ppm or less. Therefore, it is preferable that the rate of temperature increase be 5° C./min or more and 15° C./min or less.

Figure 5:
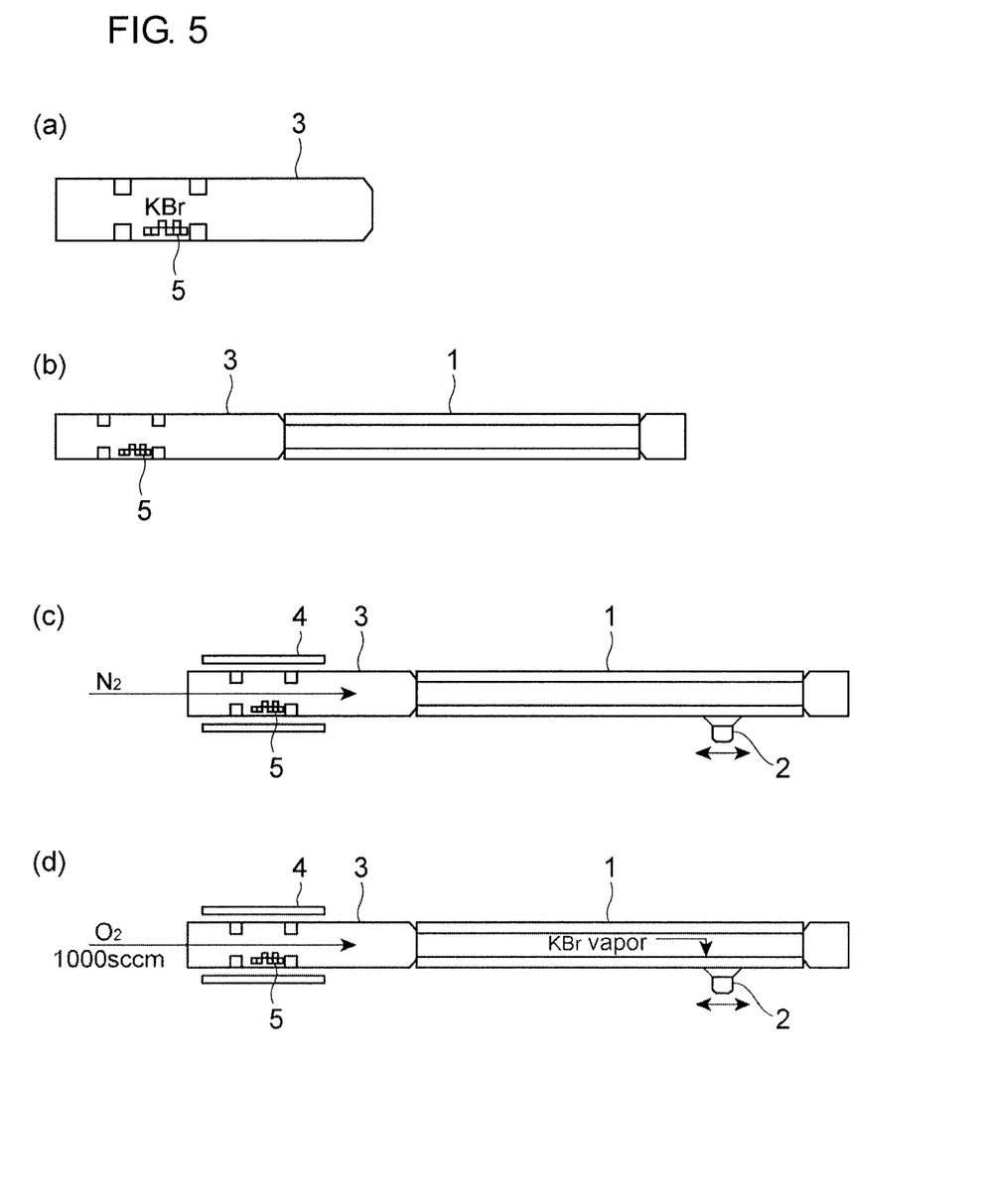
FIG. 5 is a conceptual diagram showing the process of making an optical fiber preform in Example 1.

In the following, an explanation of Example 1 will be given in reference to FIG. 5 illustrating a conceptual diagram of a process for making an optical fiber preform in Example 1. In Example 1, KBr was used as the alkali metal source.

First of all, the inside diameter of a handling glass pipe 3, which was placed on a glass lathe, was decreased at two parts for the purpose of providing a material supplying part, where 5 g of KBr was put as alkali metal source 5 (Region (a)). Then, a silica glass pipe 1 was connected to the handling glass pipe 3 (Region (b)). The glass pipe 1 had dimensions of 32 mm in outside diameter, 15 mm in inside diameter, and 500 mm in length, and contained Cl at a concentration of 200 atomic ppm and fluorine at a concentration of 4000 atomic ppm. The alkali metal source 5 was dried by flowing dry $N_2$ while heating the material supplying part at a temperature of 600° C. for 30 minutes with a heat source (electric furnace) 4 (Region (c)).

The material supplying part was heated to a temperature of 720° C., which was lower than the melting point 734° C. of KBr, while the carrier gas $O_2$ was caused to flow at 1 SLM. At that time the temperature of a heat source 4 for heating the material was set to 750° C. After the temperature increase of the heat source 4 was confirmed, the diffusion doping of potassium into the inner surface of the glass pipe 1 was carried out by heating the glass pipe 1 with the heat source 2 moving at a speed of 40 mm/min so as to make the surface temperature of the glass pipe 1 to be 2200° C. or more. Also, simultaneously with the start of the potassium diffusion doping, the temperature of the material on the material supplying part was raised up to 750° C. at a heating rate of 10° C./min. At that time the set temperature of the heat source 4 was 780° C.

After maintaining such temperature for 5 minutes, the temperature of the heat source 4 was confirmed to have increased to 780° C., and the material temperature was further raised up to 820° C. at a rate of 10° C./min regardless of reciprocating movement of the heat source 2. At that time the set temperature of the heat source 4 was 850° C. After the temperature was confirmed to have increased to 850° C. with respect to the heat source 4, the traverse of the heat source 2 was performed 15 times in total while the electric power was controlled so as to constantly keep the temperature at 850° C., whereby potassium was diffused into the inside surface of the glass pipe 1 (Region (d)).

Figure 6:
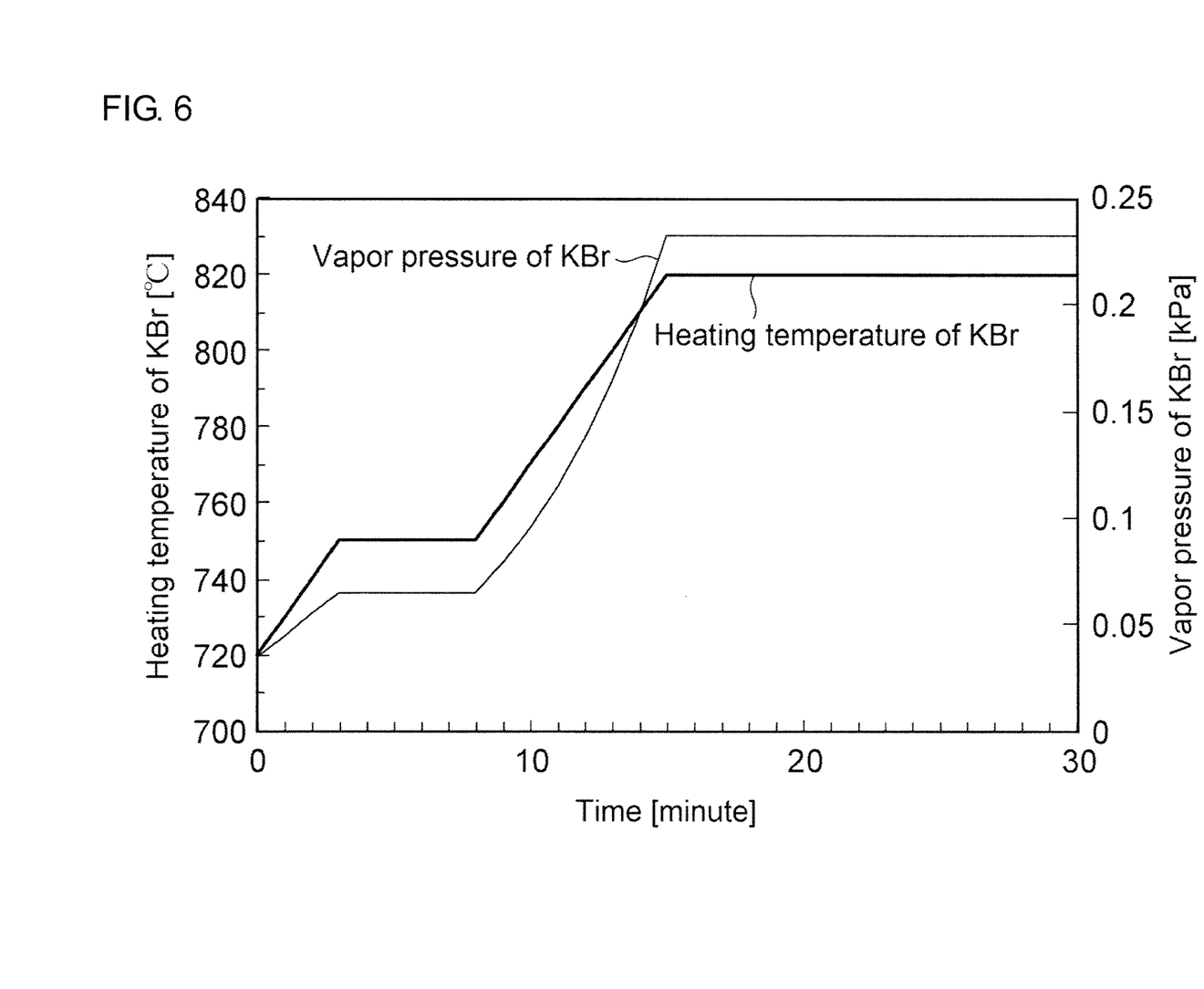
FIG. 6 is a graph showing a temperature profile for temperature increase of alkali metal and a vapor pressure profile of alkali metal salt in Example 1.

FIG. 6 is a graph showing a temperature increase profile of alkali metal 5 heated by a heat source 4 and a vapor pressure profile of alkali metal salt in Example 1. When heating the alkali metal source 5 up to a temperature for making the vapor pressure of alkali metal salt to be an intended value larger than 0.1 kPa, it is preferable to maintain an intermediate temperature for a certain duration, since thereby generation of crystals can be decreased and a glass body which contains alkali metal without crystals can be produced.

In the subsequent process, the inside pressure of the glass pipe 1 which contained potassium was set to −0.05 kPa or less by gage pressure and the heating of the glass pipe 1 by the flame of the heat source 2 was continued at a temperature of 2200° C. or more in the same manner as in the diffusion process until the inner diameter of the glass pipe 1 became 3 mm or less. After the inner diameter of the glass pipe 1 became 3 mm, the glass pipe 1 was heated while $SF_6$ (0.1 SLM) and oxygen (0.2 SLM) were caused to flow inside the glass pipe 1, and a layer containing the impurities of transition metal which had diffused simultaneously with potassium was removed by etching at a thickness of about 600 μm from the inner surface of the glass pipe 1.

While the inside gage pressure of the glass pipe 1 after such etching was reduced to −2 kPa or less, the flame of the heat source (oxy-hydrogen burner) 2 having a temperature of 2200° C. or more was caused to traverse at a rate of 30 mm/min, whereby the glass pipe 1 was collapsed, resulting in a transparent core rod. From the core rod surface, an outer layer having a high concentration of OH group and a thickness of 2 mm, which was formed due to heating by the oxy-hydrogen burner, was removed by mechanical polish.

Around the periphery of the core rod thus obtained, a silica glass pipe containing Cl at a concentration of 13,000 ppm was collapsed, whereby a core rod having an enlarged-diameter part was obtained. Such diameter-enlarged core rod had a diameter as large as 3.5 times the diameter of the first produced potassium-containing core rod. An optical cladding part was formed around the diameter-enlarged core rod by collapsing a glass pipe which contained fluorine for making the cladding part to have a relative refractive index difference of 0.34% with respect to the core portion.

Figure 7:
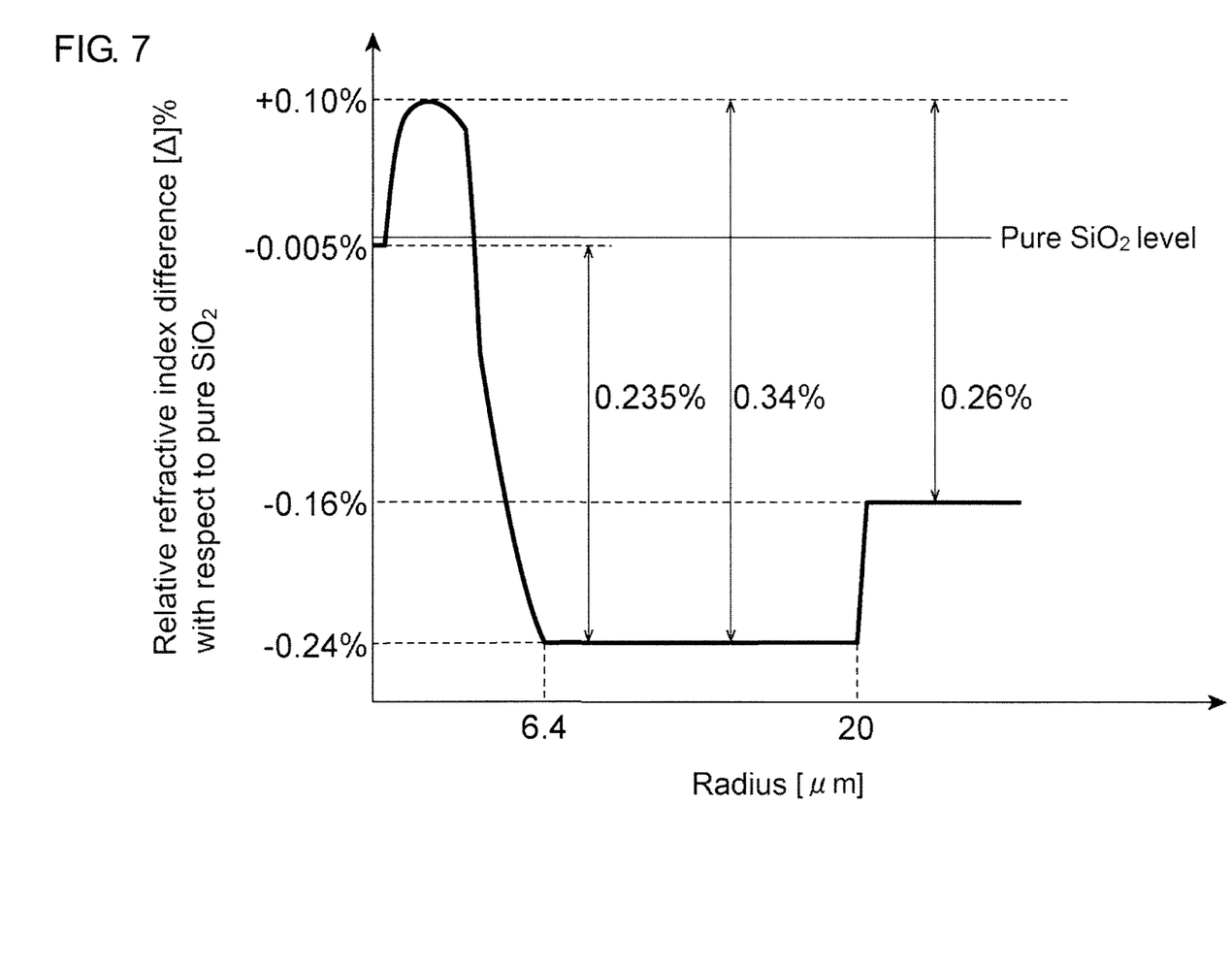
FIG. 7 is a graph showing a refractive index profile of an optical fiber made in Example 1.

Such core rod having the optical cladding was elongated to have a predetermined diameter, and thereafter fluorine-doped silica glass was synthesized around the outside of the core rod so as to make a physical cladding part, whereby an optical fiber preform having a diameter of 125 mm was prepared. In such case, there were no crystals generated in the whole length. The optical fiber preform was drawn with a tension of 50 g at a line speed of 2300 m/min into an optical fiber. FIG. 7 is a graph showing a refractive index profile of an optical fiber made in Example 1. The characteristics of the optical fiber manufactured in Example 1 were as shown in Table 1. Thus, an optical fiber having a low attenuation was obtained.

TABLE I

| Item | Unit | | Example 1 | Example 2 |
|---|---|---|---|---|
| Attenuation | @ 1300 nm | dB/km | 0.28 | 0.29 |
| Attenuation | @ 1380 nm | dB/km | 0.32 | 0.34 |
| Attenuation | @ 1550 nm | dB/km | 0.155 | 0.162 |
| Chromatic dispersion | @ 1550 nm | ps/nm/km | 21.1 | 16.3 |
| Dispersion slope | @ 1550 nm | ps/nm$^2$/km | 0.061 | 0.057 |
| Effective area | @ 1550 nm | μm$^2$ | 139 | 82 |
| Mode field diameter | @ 1550 nm | μm | 12.7 | 10.4 |
| Fiber cutoff wavelength | 2 m fiber | nm | 1580 | 1310 |
| Cable cutoff wavelength | 22 m fiber | nm | 1480 | 1210 |
| Polarization mode dispersion | C, L band | ps/√km | 0.01 | 0.01 |
| Nonlinear coefficient | @ 1550 nm, Random polarization | (W · km)$^{-1}$ | 0.6 | 0.6 |

Figure 8:
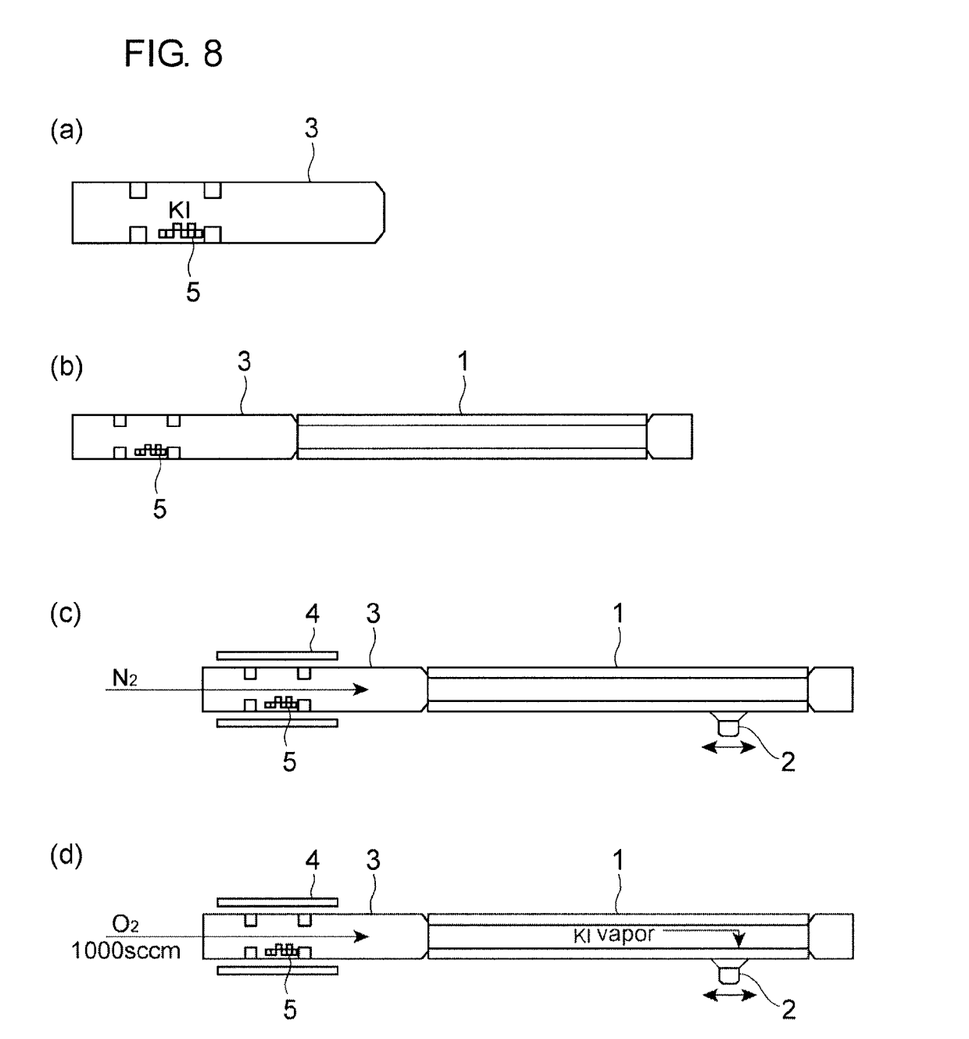
FIG. 8 is a conceptual diagram showing the process of making an optical fiber preform in Example 2.

In the following, an explanation of Example 2 will be given. In Example 2, KI was used as the alkali metal source. FIG. 8 is a conceptual diagram of a process for making an optical fiber preform in Example 2.

First of all, the inside diameter of a handling glass pipe 3, which was placed on a glass lathe, was decreased at two parts for the purpose of providing a material supplying part, where 10 g of KI was put as alkali metal source 5 (Region (a)). Then, a silica glass pipe 1 was connected to the handling glass pipe 3 (Region (b)). The glass pipe 1 had dimensions of 32 mm in outside diameter, 15 mm in inside diameter, and 500 mm in length and contained Cl at a concentration of 200 atomic ppm and fluorine at a concentration of 4000 atomic ppm. The alkali metal source 5 was dried by flowing dry $N_2$ while heating the material supplying part at a temperature of 600° C. for 30 minutes with a heat source (electric furnace) 4 (Region (c)).

The material supplying part was heated to a temperature of 650° C. which was lower than the melting point 681° C. of KI, while the carrier gas $O_2$ was caused to flow at 1 SLM. At that time the temperature of a heat source 4 for heating the material was set to 680° C. After the temperature increase of the heat source 4 was confirmed, the diffusion doping of potassium into the inner surface of the glass pipe 1 was carried out by heating the glass pipe 1 with the heat source 2 moving at a speed of 40 mm/min so as to make the surface temperature of the glass pipe 1 to be 2200° C. or more. Also, simultaneously with the start of the potassium diffusion doping, the temperature of the material on the material supplying part was raised up to 720° C. at a heating rate of 10° C./min. At that time the set temperature of the heat source 4 was 750° C.

After maintaining such temperature for 5 minutes, the temperature of the heat source 4 was confirmed to have increased to 750° C., and the material temperature was further raised up to 820° C. at a rate of 10° C./min regardless of reciprocating movement of the heat source 2. At that time the set temperature of the heat source 4 was 850° C. After the temperature of the heat source 4 was confirmed to have increased to 850° C., the traverse of the heat source 2 was performed 15 times in total while controlling the electric power so as to keep the temperature constantly at 850° C., whereby potassium was caused to diffuse into the inside surface of the glass pipe 1 (Region (d)).

Figure 9:
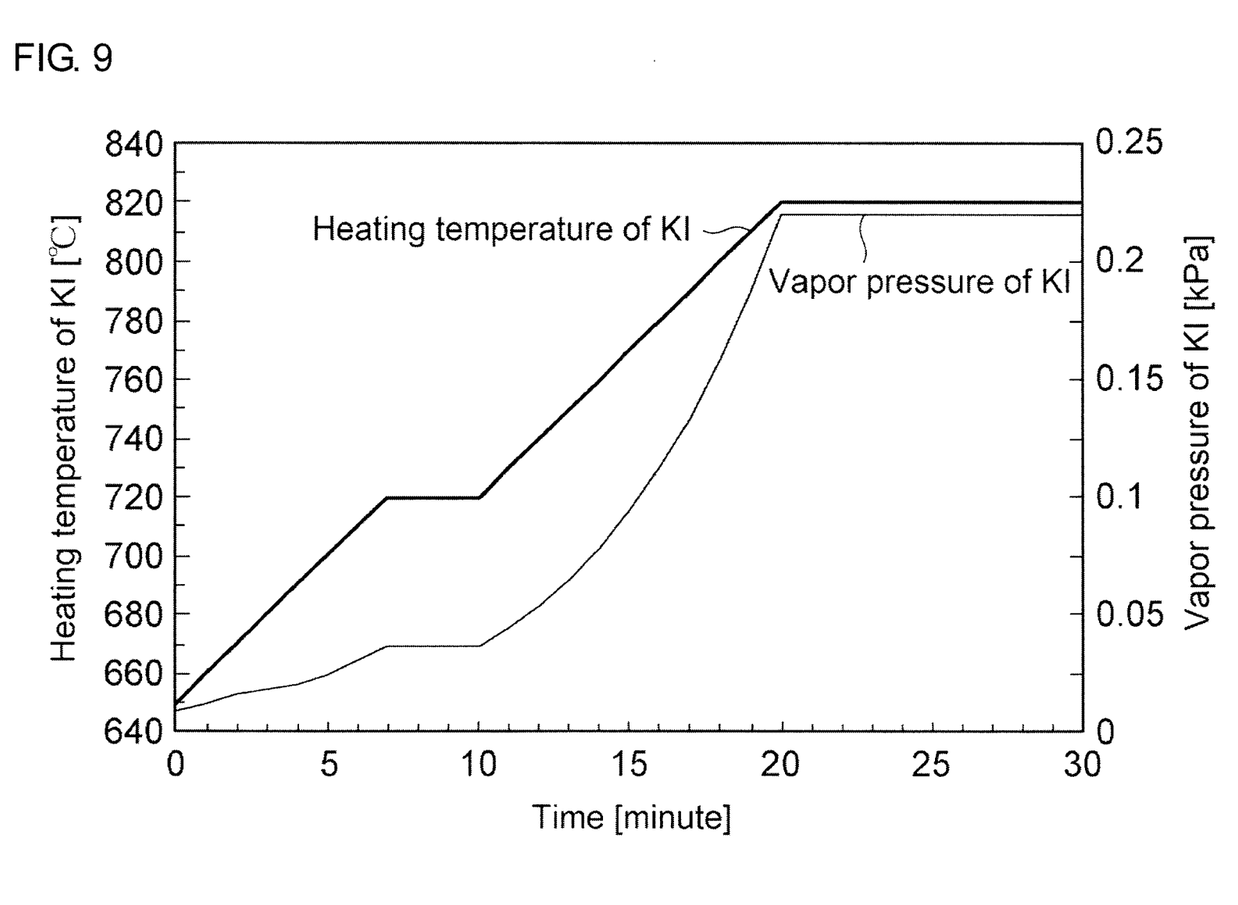
FIG. 9 is a graph showing a temperature profile for temperature increase of alkali metal and a vapor pressure profile of alkali metal salt in Example 2.

FIG. 9 is a graph showing a temperature increase profile of alkali metal 5 heated by a heat source 4 and a vapor pressure profile of alkali metal salt in Example 2. When heating the alkali metal source 5 up to a temperature for making the vapor pressure of alkali metal salt to be an intended value larger than 0.1 kPa, it is preferable to maintain an intermediate temperature for a certain duration, since thereby generation of crystals can be decreased and accordingly a glass body which contains alkali metal without crystals can be produced.

In the subsequent process, the inside pressure of the glass pipe 1 containing potassium was set to −0.05 kPa or less by gage pressure and the heating of the glass pipe 1 by the flame of the heat source 2 was continued at a temperature of 2200° C. or more until the inner diameter of the glass pipe 1 became 3 mm or less in the same manner as in the diffusion process. After the inner diameter of the glass pipe 1 became 3 mm, the glass pipe 1 was heated while $SF_6$ (0.1 SLM) and oxygen (0.2 SLM) were caused to flow inside the glass pipe 1a, a layer containing impurities of transition metal which had diffused simultaneously with potassium was removed by etching the inner surface of the glass pipe 1 at a thickness of about 600 μm.

While the inside gage pressure of the glass pipe 1 after such etching was reduced to −2 kPa or less, the flame of the heat source (oxy-hydrogen burner) 2 having a temperature of 2200° C. or more was caused to traverse at a rate of 30 mm/min, whereby the glass pipe 1 was collapsed, resulting in a transparent core rod. From the surface of the core rod, an outer layer having a thickness of 2 mm, which was formed due to heating by the oxy-hydrogen burner and which had a high concentration of OH group, was removed by mechanical polish.

Around the periphery of the core rod thus obtained, a silica glass pipe containing Cl at a concentration of 13,000 ppm was collapsed, whereby a core rod having an enlarged-diameter part was obtained. Such diameter-enlarged core rod had a diameter as large as 3.5 times the diameter of the first produced potassium-containing core rod. An optical cladding part was formed around the diameter-enlarged core rod by collapsing a glass pipe which contained fluorine for making the cladding part to have a relative refractive index difference of 0.395% with respect to the core portion.

Figure 10:
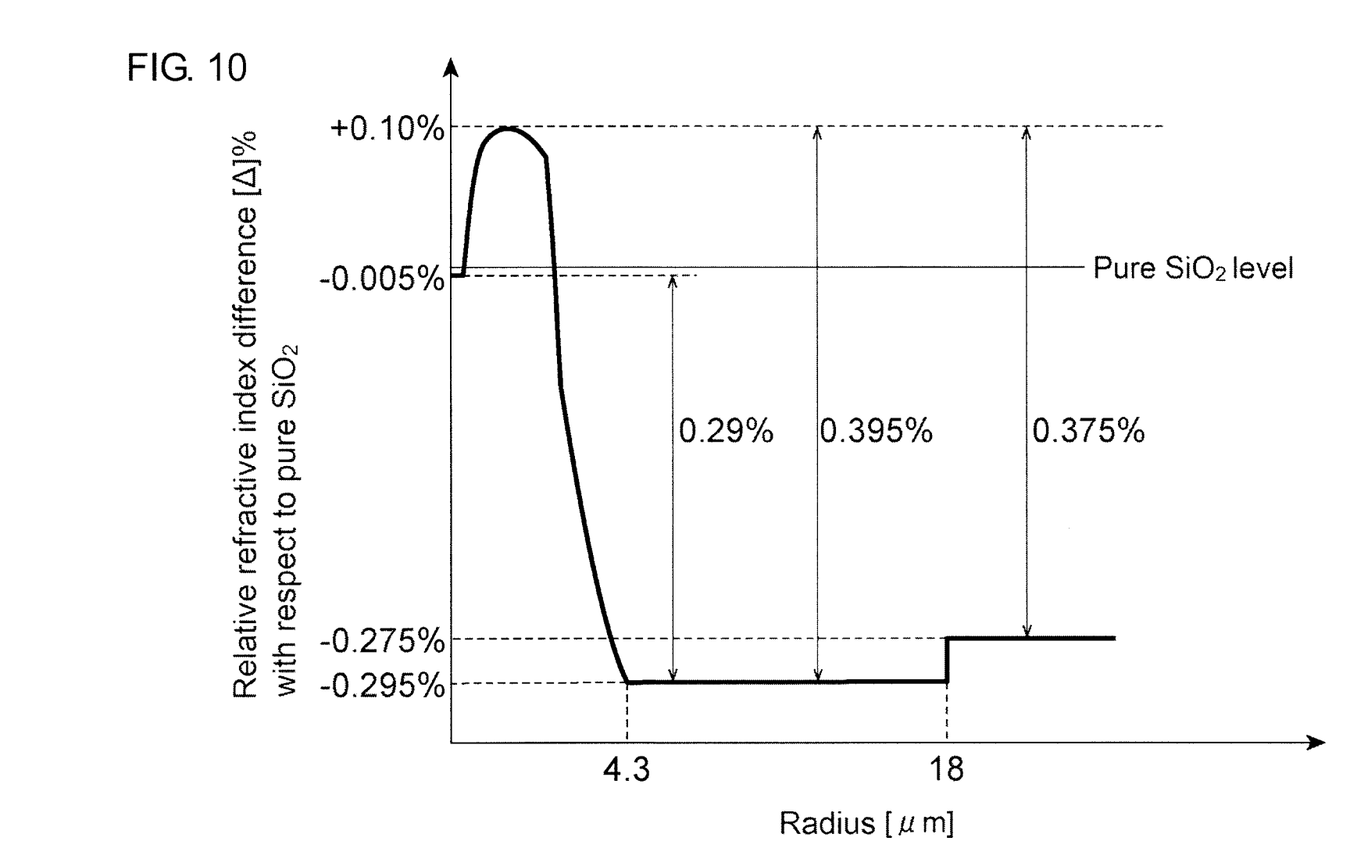
FIG. 10 is a graph showing a refractive index profile of an optical fiber made in Example 2.

After such core rod having the optical cladding was elongated to have a predetermined diameter, an optical fiber preform having a diameter of 125 mm was prepared by synthesizing fluorine-doped silica glass around the outside of the core rod so as to make a physical cladding part. In such case, there were no crystals generated in the whole length. The optical fiber preform was drawn with a tension of 50 g at a line speed of 2300 m/min into an optical fiber. FIG. 10 is a graph showing a refractive index profile of an optical fiber made in Example 2. The characteristics of the optical fiber manufactured in Example 2 were as shown in Table 1. Thus, an optical fiber having a low attenuation was obtained.

In the following, an explanation of Comparative Example 1 will be given. In Comparative Example 1, KBr was used as the alkali metal source and the manufacturing procedures were the same as adopted in Example 1 until the step of drying the alkali metal source 5 by flowing dry $N_2$. After the temperature increase up to 850° C. of the heat source 4 (the temperature of KBr: 820° C.) was confirmed, the diffusion doping of potassium into the inner surface of a glass pipe 1 was carried out by moving the heat source 2 at a rate of 40 mm/min so as to make the surface temperature of the glass pipe 1 to be 2200° C. or more. Thereafter, an optical fiber preform was prepared in the same manner as Example 1, and further an optical fiber was manufactured. In Comparative Example 1, crystals occurred at five parts in the longitudinal direction of the optical fiber preform. A resultant optical fiber had a refractive index profile as shown in FIG. 7. In the case of this optical fiber, the attenuation at a wavelength of 1.55 μm was 0.156 dB/km in a section containing no crystals, but the attenuation in a section containing crystals was immeasurable or 0.2 dB/km or more at the wavelength of 1.55 μm.

Next, Comparative Example 2 will be described. In Comparative Example 2, KI was used as the alkali metal source and the manufacturing procedures were the same as those adopted in Example 2 until the step of drying the alkali metal source 5 by flowing dry $N_2$. After the temperature increase up to 850° C. of the heat source 4 (the temperature of KI: 820° C.) was confirmed, the diffusion doping of potassium into the inner surface of a glass pipe 1 was carried out by heating the glass pipe 1 with the heat source 2 moving at a rate of 40 mm/min so as to make the surface temperature of the glass pipe 1 to be 2200° C. or more. Thereafter, an optical fiber preform was prepared in the same manner as in the case of Example 2, and further an optical fiber was manufactured. In Comparative Example 2, crystals occurred at twenty parts in the longitudinal direction of the optical fiber preform. A resultant optical fiber had a refractive index profile as shown in FIG. 10. In this optical fiber, a section containing no crystals had an attenuation of 0.163 dB/km at a wavelength of 1.55 μm; whereas a section containing crystals exhibited variations in glass diameter, and the attenuation thereof was immeasurable or 0.3 dB/km or more at the wavelength of 1.55 μm.

Figure 11:
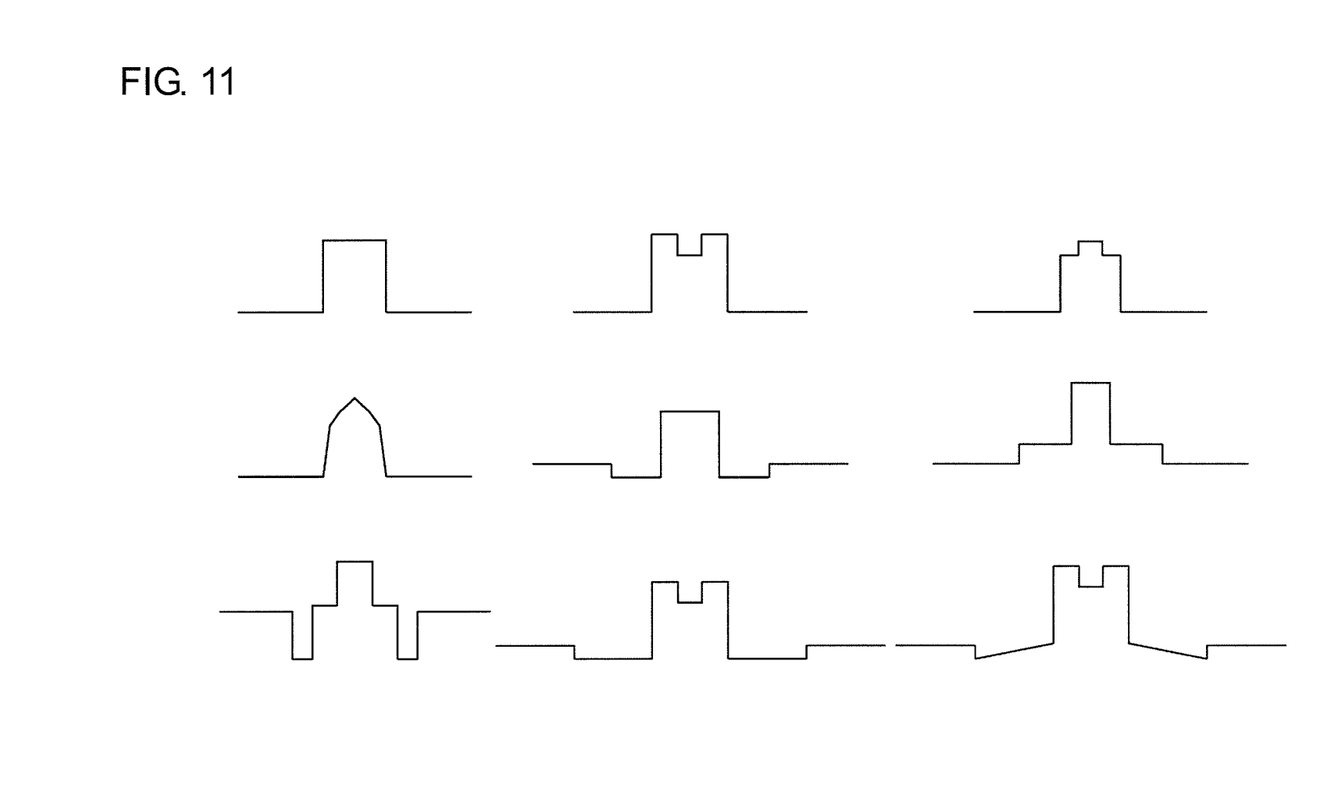
FIG. 11 is conceptual diagrams illustrating other examples of refractive index profile of an optical fiber.

The diameter of the core portion may be 6 μm or more and 20 μm or less, and the relative refractive index difference between the core portion and the cladding portion may be 0.2% or more and 0.5% or less. The attenuation decreases if the silica glass has a cladding portion containing fluorine and having an average refractive index lower than that of the core portion, which contains alkali metal and halogens (Cl and fluorine) and if the halogen concentration is the highest as compared with concentration of other respective elements. Also, the core portion and the cladding portion may each have a fine structure of refractive index and may have profiles as shown in FIG. 11, for example, but not restricted to them.

PRIOR ART LITERATURE

Patent Literature

[Patent Literature 1] JP 2005-537210A
[Patent Literature 2] US 2006-0130530A
[Patent Literature 3] JP 2007-504080A
[Patent Literature 4] JP 2008-536190A
[Patent Literature 5] JP 2010-501894A
[Patent Literature 6] JP 2009-541796A
[Patent Literature 7] JP 2010-526749A
[Patent Literature 8] WO 1998/002389
[Patent Literature 9] U.S. Pat. No. 5,146,534B
[Patent Literature 10] U.S. Pat. No. 7,524,780

What is claimed is:

1. An optical fiber preform manufacturing method comprising:
    a thermal diffusion process for oxidizing and thermally diffusing an alkali metal element into the inner side of a silica glass pipe, the glass pipe being heated with a heat source performing relative movement in the longitudinal direction of the glass pipe, while vapors of alkali metal salt generated by heating an alkali metal salt is supplied with a carrier gas to the inside of the glass pipe from an end thereof, the thermal diffusion process including:
    heating up the glass pipe to a temperature of 1500° C. or more and 2200° C. or less while heating the alkali metal salt at a temperature for making the vapor pressure of the alkali metal salt to be 0.1 kPa or less, and
    raising up the heating temperature of the alkali metal salt to a temperature for making the vapor pressure of the alkali metal salt to be larger than 0.1 kPa, while maintaining the heating temperature of the glass pipe at 1500° C. or more and 2200° C. or less;
    a collapsing process for forming a core rod by collapsing the glass pipe after the thermal diffusion process; and
    a cladding process for adding a cladding part around the circumference of the core rod.

2. An optical fiber preform manufacturing method according to claim 1, wherein
    at the start of the thermal diffusion of the alkali metal element into the inner side of the glass pipe in the thermal diffusion process, the vapor pressure of alkali metal salt is made 0.05 kPa or less.

3. An optical fiber preform manufacturing method according to claim 1, wherein
    at the time of heating the alkali metal salt up to a temperature for making the vapor pressure of alkali metal salt to be larger than 0.1 kPa, the temperature increase rate is 5° C./min or more and 15° C./min or less.

4. An optical fiber preform manufacturing method according to claim 1, wherein
    at the time of heating the alkali metal salt up to a temperature for making the vapor pressure of alkali metal salt to be larger than 0.1 kPa, the heating temperature is maintained at an intermediate temperature for a given time.

5. An optical fiber preform manufacturing method according to claim 1, wherein
    at the start of thermal diffusion of the alkali metal element into the inner side of the glass pipe, the heating temperature of alkali metal salt is the melting point of the alkali metal salt or less.

6. An optical fiber preform manufacturing method according to claim 1, wherein
    at the start of thermal diffusion of the alkali metal element into the inner side of the glass pipe, the heating temperature of alkali metal salt is 734° C. or less.

7. An optical fiber preform manufacturing method according to claim 1, wherein
    the alkali metal salt is potassium bromide or potassium iodide at the thermal diffusion process.

8. An optical fiber preform manufacturing method according to claim 1, wherein
    the carrier gas contains oxygen at the thermal diffusion process.

* * * * *